United States Patent Office 2,930,697
Patented Mar. 29, 1960

2,930,697

PROCESS FOR PRODUCING QUICK COOKING CEREAL PRODUCT

Frederick J. Miller, Jersey City, N.J., assignor to General Foods Corporation, White Plains, N.Y., a corporation of Delaware No Drawing. Application January 15, 1957
Serial No. 634,174

14 Claims. (Cl. 99—80)

This invention relates to quick-cooking vegetable-like food products.

The present invention can be employed in the processing of wheat, de-hulled oats, sorghum, rye, and like grains having nutritive integuments and a generally compressible farinaceous endosperm. Such grains generally have not been fully exploited as vegetable-like food products due to difficulty and lack of convenience in cooking them. Either because of lack of culinary skill on the part of the housewife or the undesirably long cooking period required, when such cooked grains are prepared in the home they are often quite unpalatable and not readily digested. Thus, if the average housewife attempts to provide a sufficiently moist and palatable household-cooked product from these grains, the starch granules are unevenly gelatinized; the outside of the grain is pasty and unpalatable due to rupture of its outer starch granules; and starch granules at the center of the grain remain relatively ungelatinized and raw in flavor. Much of this difficulty stems from the presence of the epidermis or skin which ordinarily overlies a nutritive and hence desirably retained mesosperm or inner integument which would be substantially removed on milling or other processing but for the presence of at least some of the epidermis or skin. Accordingly, such outer edible integuments are preferably retained, but due to their presence the above cooking difficulties arise.

The object of this invention is to provide a quick-cooking grain product of the aforesaid character which has its nutritive integuments retained and which is palatable and readily digested as a vegetable-like food.

According to the present invention, the aforesaid grains are processed in a series of steps eventually resulting in a dried product having its starch granules uniformly gelatinized and having an enlarged porous vesicular structure with nutritive integuments broken and adhering thereto. The processed grain is quickly and conveniently rehydrated and swells into a ready-to-eat vegetable-like product which is both palatable and digestible.

In the present process the raw grain is first soaked to increase its moisture content so that it softens and swells. The soaked grain is then flattened from its original swollen condition to break or crack the epidermis or skin as well as the endosperm whereby part of the starchy mass of the grain is visible and the endosperm is exposed for further penetration of water. The flattened grain retains its identity as such and is compressed to the extent that it does not assume the shape it had prior to compression but is sufficiently integrated so that it swells and does not decompose when it is introduced to additional water and cooked. The grain is then cooked to gelatinize its starch. Cooking preferably involves first introducing the grain to water so that it swells and its water absorption capacity is reached; this is followed by cooking with steam whereby substantially uniform gelatinization of the starch granules is accomplished and the epidermis or skin portions adhere to the grain. Alternatively, the flattened grain can simply be water-cooked, sufficient water to effect thorough gelatinization in the grain being employed but not an excess of water. Water cooking is less preferred because of care required in avoiding possible losses in soluble starch and grain fragments in draining the cook water.

The swollen cooked grain is then dried, preferably after washing, by circulating heated air through the grain to remove moisture from its surface at a rate sufficiently faster than it can diffuse thereto from its interior to set the grain in its enlarged condition with its adhering epidermis or skin portion thereon to produce a porous, vesicular structure. Drying is preferably done at a rapid rate. The maximum moisture absorption and rehydration rates are obtained by rapid drying of the cooked grains; these rehydration advantages also prevail at relatively low drying rates but to a lesser extent.

The above steps are related to one another in a number of highly desirable and important respects. The ability of the partially hydrated grain resulting from soaking to pick up additional moisture is further facilitated by the condition of the grain after it is compressed. Each flattened partially hydrated grain swells when introduced to water and its integuments and endosperm are sufficiently broken or cracked to allow penetration of the water to the starchy interior of the grain. As a result the moisture content of the grain is elevated and distributed to the extent that uniform gelatinization of the starch throughout the endosperm can be obtained. Furthermore, the character of compression is such that the nutritive integuments adhere to the endosperm during the cooking step and in later washing. As a result of the controlled gelatinization of the starch granules the swollen grain can be dried to produce an enlarged porous, vesicular structure. In addition, any losses of grain solids, soluble or otherwise, during cooking and later in washing is minimized despite the farinaceous character of the endosperm. The structure of the dried grain is so ideal that the grain can be simply rehydrated in a bare minimum of hot water, thereby substantially reducing any loss of essential vitamins and minerals. The dried product of the process is ready to eat after being soaked for 10 minutes in hot water, boiling or below; the rehydrated grain reverts substantially to the swollen cooked condition that it had prior to drying, and is thoroughly palatable and digestible. In the dried condition, to accommodate usage and taste, the product may be subdivided and recombined with suitable spices and flavors or it can be pre-flavored during the process.

For the purposes of further describing the present invention, reference can be had to the following examples.

Raw, whole, soft, white wheat having an original moisture content of 10–15% is soaked in water for 15 minutes at a temperature of about 200° F. to increase its moisture content to 30–45%. The wheat softens and swells. After this moisture content is reached, free water is drained. The soaked wheat is then passed through a pair of 12" diameter rolls, driven at 15–20 r.p.m. and having a roll spacing of 0.010–0.020 in. In this step the bran coat of the wheat is compressed and opened but is retained on the partially hydrated starchy endosperm. The grain as a whole is flattened to the extent that it will not reassume its original swollen shape but it retains sufficient elasticity to expand after compression so that the starch granules are desirably exposed to the ingress of cook water through the outer integuments to the interior. Some of the starch granules in the compressed grain are not completely hydrated as observed by their white powdery appearance, whereas others are somewhat hydrated and only slightly gelatinized.

The flattened wheat is then immersed in 70° F. water to further increase its moisture content to 55–60%. In this step, the flattened grain swells. This is usually accomplished in a few seconds. Instead of water-immersion, the flattened grains may be sprayed with water but in any event it is preferred for the purposes of effective gelatinization in later cooking that the moisture achieve a level in the wheat of at least 50%. The water is then drained and the swollen grains are steam cooked by atmospheric steam blanching for 10–15 minutes during which time each grain's starch granules are substantially gelatinized by the ingress of steam through the bran coat into the endosperm. When water cooking is effected under super-atmospheric pressure, the moisture requirement is substantially lowered. Also, cooking may be effected by pressure cooking in an atmosphere of steam. In any event, the moisture content of the gelatinized cooked granules should not exceed 75%. A combination of resoaking and steam cooking is preferred inasmuch as this allows a greater control of the final moisture content and extent of gelatinization of the wheat starch as a whole. Furthermore, this procedure assures optimal retention of the bran coat on the surface of the swollen cooked grain.

After steam cooking the grain it is preferably washed with cold tap water (70° F.) to facilitate handling, the washed grain being less sticky, and less likely to clump. The washed grain also swells having absorbed about 5–10% of additional moisture.

After washing, the grains are drained of free water for one to two minutes and fed to a Proctor and Schwartz atmospheric tray drier where the moisture content of the cooked grains is rapidly reduced to 5–15% in about 10–20 minutes. With this drier, the product is treated at an air temperature of 275°–300° F., the air being circulated through a bed of the product and having a superficial air velocity of about 600 ft. per minute but ranging broadly from 400–800 ft. per minute. The bed of product in drying has a thickness of about ½" to 1".

Although the drying conditions specified herein are typical of an accelerated drying step wherein moisture is rapidly evaporated from the swollen grain, this invention is not to be so restricted, although such rapid drying is preferred since it results in a product having the highest rehydrated volume and the highest rates of rehydration. The wheat product of this example experiences an increase in the volume of the dry product of 200–300% over the volume of the raw grain. The volume of the rehydrated product has an increase of about 300–500% over that of the whole raw grain. This product rehydrates quickly to a palatable, digestible "cooked" vegetable-like product having a chewy consistency; rehydration is effected merely by spoon stirring the dry product in water at 212° F. removing it from the flame and allowing it to stand for 8–10 minutes.

A quick-cooking edible product has been achieved from all classes of wheat as well as sorghum, rye, and de-hulled oats by following conditions substantially the same as those specified herein for soft white wheat. Other grains of similar structure can be processed in this manner. The grains which can be processed generally have one or more nutritive integuments surrounding a relatively compressible, starchy, farinaceous endosperm.

While the present invention has been described with particular reference to specific examples, it is not to be limited thereby, but reference is to be had to the appended claims for a definition of its scope.

What is claimed is:

1. The process of preparing a quick-cooking vegetable-like food product from a grain having nutritive integuments and a compressible farinaceous endosperm and selected from the group consisting of wheat, sorghum, rye and de-hulled oats which comprises soaking the grain for a period of time and at a temperature sufficient to increase its moisture content whereby it softens and swells, flattening the swollen and softened grain to break its integuments and endosperm whereby part of the starchy mass of the grain is visible and exposed to further penetration of water, the flattened grain retaining its identity as such and being compressed to the extent that it does not assume the shape it had prior to compression but is sufficiently integrated so that it swells and does not break up when it is introduced to additional water and cooked to gelatinize the starch, hydrating the flattened grain to cause substantial swelling thereof and further increase its moisture content and cooking the swollen flattened grain in the absence of an excess of water, whereby its starch granules are uniformly gelatinized, and whereby losses of soluble starch and grain fragments are avoided, and drying the swollen grain by circulating heated air through it to remove moisture from its surface at a rate sufficiently faster than the moisture can diffuse thereto from its interior to set it in its enlarged condition and thereby produce a porous, vesicular structure having adhering broken integuments thereon.

2. The process of claim 1 wherein the grain is wheat.

3. A process according to claim 2 wherein the soaked wheat is bumped by compressing between a pair of 12" diameter rolls having a roll spacing of 0.010 to 0.020 inch.

4. The process of claim 1 wherein the grain is de-hulled oats.

5. The process of claim 1 wherein the grain is sorghum.

6. The process of claim 1 wherein the grain is rye.

7. The process of preparing a quick-cooking vegetable-like food product from a grain having nutritive integuments and a compressible farinaceous endosperm and selected from the group consisting of wheat, sorghum, rye and de-hulled oats which comprises soaking the grain for a period of time and at a temperature sufficient to increase its moisture content whereby it softens and swells, flattening the swollen and softened grain to break its integuments and endosperm whereby part of the starchy mass of the grain is visible and exposed to further penetration of water, the flattened grain retaining its identity as such and being compressed to the extent that it does not assume the shape it had prior to compression but is sufficiently integrated so that it swells and does not break up when it is introduced to additional water and cooked to gelatinize the starch, soaking the flattened grain in water so that it swells and its moisture content is further increased, subjecting the swollen grain to steam so that its starch granules are uniformly gelatinized whereby losses of soluble starch and grain fragments are avoided, and drying the swollen grain by circulating heated air through the grain to remove moisture from its surface at a rate sufficiently faster than the moisture can diffuse thereto from its interior to set it in its enlarged condition and thereby produce a porous, vesicular structure having adhering broken integuments thereon.

8. The process of claim 7 wherein the grain is wheat.

9. The process of claim 7 wherein the grain is de-hulled oats.

10. The process of claim 7 wherein the grain is sorghum.

11. The process of claim 7 wherein the grain is rye.

12. The process of preparing a quick-cooking vegetable-like food product from a grain having nutritive integuments and a compressible farinaceous endosperm and selected from the group consisting of wheat, sorghum, rye and de-hulled oats which comprises soaking the grain for a period of time and at a temperature sufficient to increase its moisture content to 30–45% whereby it softens and swells, flattening the swollen and softened grain to break its integuments and endosperm whereby part of the starchy mass of the grain is visible and exposed to further penetration of water, the flattened grain retaining its identity as such and being compressed to the extent that it does not assume the shape it had prior to compression but is sufficiently integrated so that it does not break up when it is introduced to additional water and cooked to gelatinize the starch, further hydrating the flattened grain to a moisture content of at least 50% and not exceeding 75% and cooking the flattened grain in the absence of an excess of water for a period sufficient to uniformly gelatinize its starch granules whereby losses of soluble starch and grain fragments are avoided, and drying the cooked grain by circulating heated air through the grain to remove moisture from its surface at a rate sufficiently faster than the moisture can diffuse thereto from its interior as to set it in its enlarged condition and thereby produce a porous, vesicular structure having adhering broken integuments thereon.

13. The process of claim 12 wherein the cooked wheat grain is dried at an air temperature of 275°–300° F. in about 10–20 minutes by means of air circulated through a bed of the product having a superficial air velocity ranging from 400 to 800 ft. per minute, the product having a final moisture content below 15%.

14. A process according to claim 1 wherein the flattened grain is washed after cooking to remove free starch.

References Cited in the file of this patent

UNITED STATES PATENTS

| | | |
|---|---|---|
| 2,720,460 | Flynn et al. | Oct. 11, 1955 |
| 2,828,209 | Hollis et al. | Mar. 25, 1958 |